United States Patent [19]

Nakajima et al.

[11] 4,451,834
[45] May 29, 1984

[54] TRANSFER TYPE HEAT SENSITIVE RECORDING DEVICE

[75] Inventors: Hisao Nakajima; Fujio Moriguchi, both of Kanagawa, Japan

[73] Assignee: Fuji Xerox Co., Ltd., Tokyo, Japan

[21] Appl. No.: 409,221

[22] Filed: Aug. 18, 1982

[30] Foreign Application Priority Data

Aug. 19, 1981 [JP] Japan .................................. 56-128772

[51] Int. Cl.³ ............................................. G01D 15/10
[52] U.S. Cl. .......................... 346/76 PH; 355/14 SH; 226/121
[58] Field of Search ................ 346/76 PH, 105, 76 R, 346/106; 400/617, 506, 507, 513, 517, 518.4, 572; 226/121; 355/14 SH

[56] References Cited

U.S. PATENT DOCUMENTS 3,762,813 10/1973 Fowlie .............................. 355/14 SH
4,127,121 3/1964 Babin ..................................... 226/121
4,404,568 9/1983 Kikuchi ............................ 346/76 PH Primary Examiner—George H. Miller, Jr.
Assistant Examiner—M. Reinhart
Attorney, Agent, or Firm—Sughrue, Mion, Zinn, Macpeak and Seas

[57] ABSTRACT

In a transfer type heat sensitive recording device a recording section is provided in which the thermal transfer of data is effected by applying thermal pulses to an ink donor sheet having a recording sheet superimposed thereon. Upon leaving the recording section, the recording sheet is separated from the ink donor sheet and upon completion of the separation, the drive for the ink donor sheet is terminated. A recording sheet discharge device is operatively driven from the ink donor sheet conveying device through a drive force accumulating mechanism so that upon stopping of the ink donor sheet conveying device, the torque accumulated by the drive force accumulating mechanism will be sufficient to continue the operation of the recording sheet discharging device until the recording sheet is fully discharged.

4 Claims, 3 Drawing Figures

TRANSFER TYPE HEAT SENSITIVE RECORDING DEVICE

BACKGROUND OF THE INVENTION

The present invention is directed to a transfer type heat sensitive recording device and more specifically to the feeding arrangement for the recording sheet and the ink donor sheet.

In transfer type heat sensitive recording devices of the type under consideration, an ink donor sheet and a recording sheet are supplied independently to a recording section whereupon the recording sheet (or an ordinary sheet of paper) is placed on the ink donor sheet coated with a heat sensitive material which is sublimated or fluidized by the application of heat. The thermal pulses applied to the superimposed sheets causes the transfer of data onto the recording sheet. The recording sheet and the ink donor sheet are then separated upon leaving the recording section.

A conventional transfer type heat sensitive recording device is shown in FIG. 1 and includes a conveying system which supplies an ink donor sheet and a recording sheet independently to a recording section. The donor sheet is supplied continuously from a supply roll 1, passes over a guide roller 3, through the recording section 4 and between a drive roller 5 and a backing roller 9 to a take-up roll 6 on which the ink donor sheet 2 is wound. The recording sheets 8 are precut to the desired length and are supplied one after the other to the recording section 4 from a sheet supplying device 7. The recording sheet 8 is superimposed on the ink donor sheet 2 for simultaneous passage through the recording section 4. In this operation, the recording sheet 8 and the ink donor sheet 2 are pressed against a thermal head 11 by a backing roll 9 to enable thermal transfer recording to take place.

A pulley 12 integral with the drive roller 5 and a pulley 13 integral with the take-up roll 6 are connected by means of belts 14 and 15 to a pair of pulleys 17 (only one of which is shown) and are turned in the directions of the arrows, respectively. The drive roller 5 presses the ink donor sheet 2 and the recording sheet 8 against the backing roll 9 so that the backing roll 9 is turned in the direction of the arrow by the rotation of the drive roller 5. A pair of sheet discharging rollers 18 and 19 are disposed above the recording section 4. A pulley 21 integral with the backing roller 9 is coupled by means of a belt 23 to a pulley 22 integral with the sheet discharging roller 18. Therefore, as the backing roller 9 rotates the sheet discharging rollers 18 and 19 are turned in the direction of the arrows as indicated in FIG. 1. As the front edge of the recording sheet 8 leaves the recording section 4 and passes between the rolls 5 and 9, the recording sheet 8 will tend to move in a direction tangential to both the backing roller 9 and the drive roller 5 due to the stiffness of the recording sheet whereby the recording sheet 8 is separated from the ink donor sheet 2 in the separation section 25 and is moved in the direction of the arrow by subsequent engagement between the sheet discharging rollers 18 and 19.

In the device, the pair of sheet discharging rollers 18 and 19 must be rotated until the rear edge 8A of the recording sheet 8 passes completely through the pair of rollers 18 and 19. Accordingly, it is necessary to turn the drive roller 5 and the backing roller 9 for a certain period of time after the rear edge 8A of the recording sheet has passed through the separation section 25. During this period of time, the ink roller sheet 2 is still being fed between the drive roller 5 and the backing roller 9 and a substantial portion of the ink donor sheet is wasted.

SUMMARY OF THE INVENTION

The present invention provides a new and improved transfer type heat sensitive recording device wherein subsequent to separation of the recording sheet from the ink donor sheet after data has been recorded, the conveyance of the ink donor sheet is stopped and only the recording sheet is conveyed. A portion of the driving force for the recording sheet feeding roller is accumulated in the drive force accumulating mechanism so that upon subsequent stopping of the drive means when the rear edge of the recording sheet passes through a separation device, the drive force accumulating mechanism will be operated to turn a pair of sheet discharging rollers only.

The present invention provides a new and improved transfer type heat sensitive recording device comprising recording means for the thermal transfer of data to a recording sheet superimposed on an ink donor sheet, supply means for supplying a recording sheet and an ink donor sheet in superimposed relation to said recording section, separating means for separating said recording sheet from said ink donor sheet subsequent to leaving said recording section, ink donor sheet conveying means for continuously conveying an indeterminate length ink donor sheet to said recording section and for stopping the conveyance of said ink donor sheet when the rear edge of said recording sheet is separated from said ink donor sheet by said separating means, recording sheet discharging means for discharging said recording sheet which has been separated by said separating means and a drive force accumulating mechanism for accumulating a portion of the drive force for said ink donor sheet conveying means when said ink donor sheet conveying means is operated and means for operating said drive force accumulating mechanism upon stopping of said ink donor sheet conveying means for continuing the operation of said recording sheet discharging means.

The foregoing and other objects, features and advantages of the invention will be apparent from the following more particular description of a preferred embodiment of the invention as illustrated in the accompanying drawings.

DETAILED DESCRIPTION OF THE INVENTION

Figure 1:
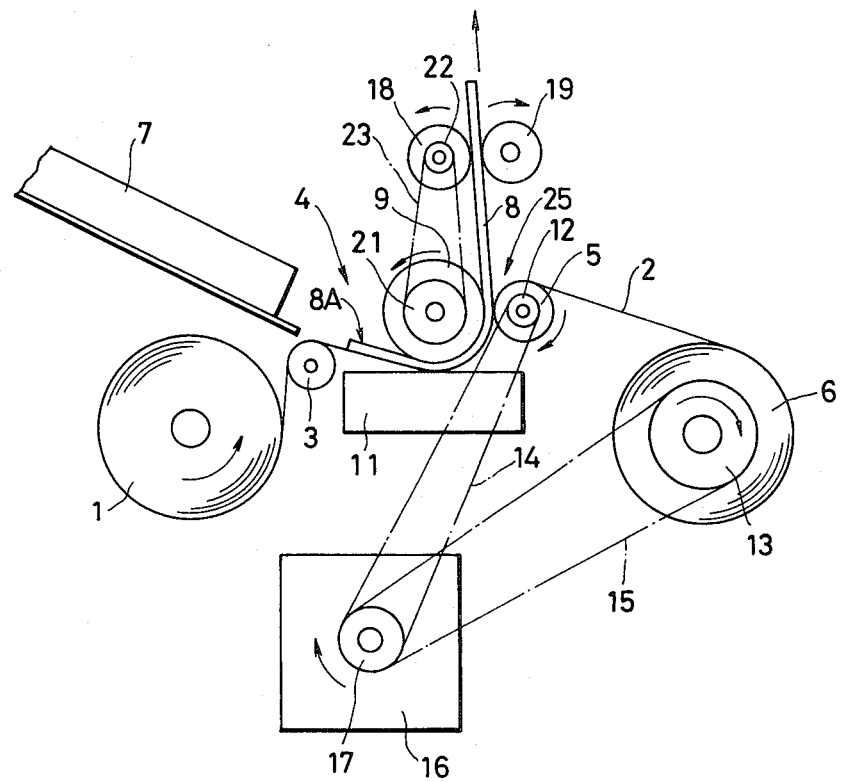
FIG. 1 is a schematic front view showing a prior art transfer type heat sensitive recording device.
Figure 2:
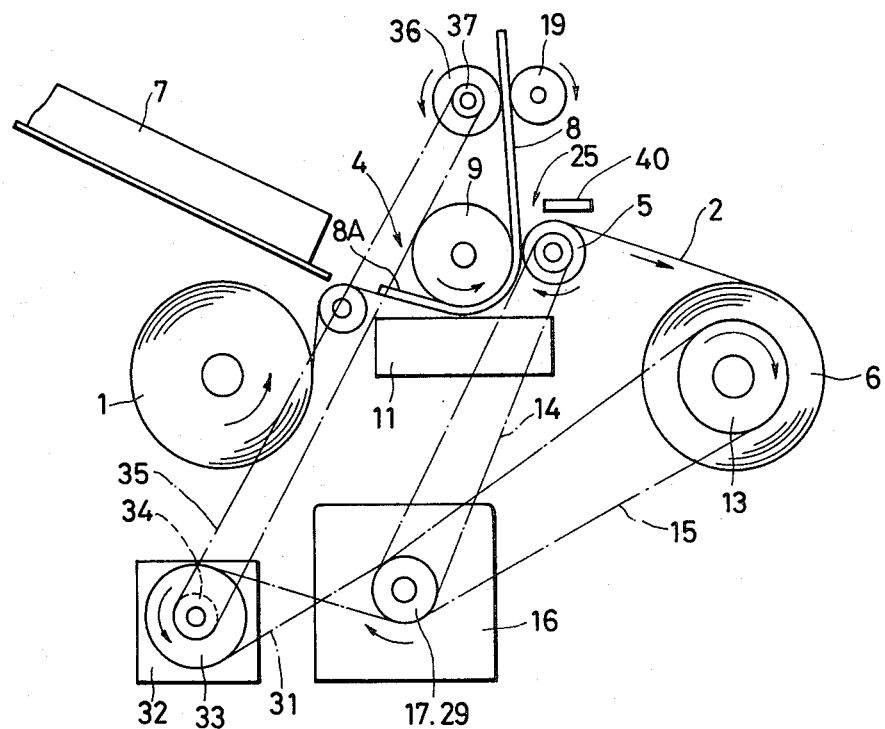
FIG. 2 is a schematic front view showing the transfer type heat sensitive recording device according to an embodiment of the present invention.

In the embodiment of the invention shown in FIGS. 2 and 3, those components which were previously described with reference to FIG. 1 are identified by the same reference numerals. The drive source 16 has an additional pulley 29 on the same shaft with the pulleys 17 which drive the drive roller 5 and take-up roll 6 through belts 14 and 15, respectively. The pulley 29 is coupled by means of a crossed belt 31 to a pulley 33 on the input side of a drive force accumulating mechanism 32. A pulley 34 on the output side of the drive force accumulating mechanism 32 is coupled through a belt 35 to a pulley 37 which is integral with the sheet discharging roller 36. A sensor 40 is provided adjacent the separation section 25 for detecting the rear edge 8A of a recording subsequent to its passage through the separation section 25.

Figure 3:
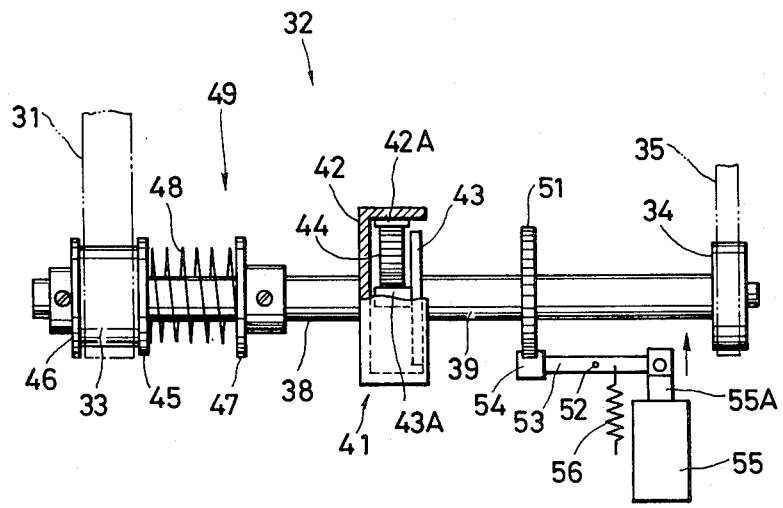
FIG. 3 is a detailed side view, partly in section, showing the drive force accumulating mechanism according to the present invention.

The details of the drive force accumulating mechanism 32 are best seen in FIG. 3 wherein first and second shafts 38 and 39 are rotatably supported coaxially relative to each other. The adjacent ends of the first and second shafts 38 and 39 are secured to the opposite ends, respectively, of a spiral spring mechanism 41. The spiral spring mechanism 41 is located within a housing defined by a cup-shaped member 42 secured to the end of the shaft 38 and a closure plate secured to the end of the shaft 39. The outer end of the spring 44 is secured to the inner wall of the cup-shaped housing 42 and the inner end of the spring 44 is connected to a shaft extension 43A protruding from the end of the shaft 39.

The input pulley 33 is connected to the shaft 38 by means of a slip clutch mechanism generally indicated at 49. A pair of first and second flanges 46 and 47 are fixedly secured to the shaft 38. The input pulley 33 and an annular plate 45 are rotatably mounted on the shaft 38 with a spring 48 secured at opposite ends to the plate 45 and the plate 47, respectively. Thus, the input pulley 33 is frictionally gripped between the plates 46 and 45 under the influence of the spring 48 so as to transmit the drive from the belt 31 which extends about the input pulley 33 to the shaft 38.

A ratchet wheel 51 is fixedly secured to the second shaft 39 and is operatively engaged by a pawl 54 of an operating member 53 which is pressed against the circumferential edge of the ratchet wheel 51 by means of the spring 56 since the operating member 53 is pivoted at 52 intermediate the pawl 54 and the spring 56. The end of the operating member 53 opposite the pawl 54 is rotatably coupled to operating rod 55A of a solenoid 55. When the pawl 54 is pressed against the ratchet wheel 55, the initial application of torque to the shaft 39 from the shaft 38 through the spring 41 is insufficient to rotate the shaft 39 and the spring 41 is wound up. When the torque being applied to the shaft 39 reaches a predetermined larger value, the pawl will slip on the circumferential edge of the ratchet wheel 51 and accordingly, the ratchet wheel 51 and the shaft 39 will begin to rotate with the shaft 38.

When a recording sheet 8 is supplied to the recording section 4 of the recording device described above, the sheet is sensed by a sensor (not shown) and the drive 16 is energized. As a result, the ink donor sheet 2 is conveyed in the direction of the arrow with the recording sheet 8 superimposed thereon. Thus, data is recorded on the recording sheet 8 as it passes the recording station 4. When the rear edge 8A of the recording sheet passes through the separation section 25 of the rear edge 8A is detected by the sensor 40 which causes the drive 16 to be deenergized and the rotation of the drive roller 5 stopped. The sensor 40 also provides a signal to energize the solenoid 55 so that the operating member 53 is pivoted counterclockwise as viewed in FIG. 3 is disengage the pawl 54 from the edge of the ratchet wheel 51. Since the drive 16 is deenergized, the input pulley 33 and the shaft 38 will also cease rotating so that the outer end of the spring 44 secured to the cup-shaped housing 42 will be stopped. Since the pawl 54 is no longer in engagement with the ratchet wheel 51, the torque accumulated in the spiral spring 44 is released and the second shaft 39 and output pulley 34 are rotated in the direction of the arrow in FIG. 2 to drive the pair of sheet discharging rollers 19 and 36 in the direction of the arrows to fully discharge the sheet 8. Thus, even after the conveyance of the ink donor sheet is stopped, the sheet discharging rollers 19 and 36 will continue to be rotated by the drive force accumulated in the drive force accumulating mechanism 32 to discharge the recording sheet as required. Thus, it is unnecessary to run the ink donor sheet to complete the discharge of the recording sheet and none of the ink donor sheet is wasted. Therefore, it is unnecessary to replace the ink donor sheet as frequently thereby facilitating the efficient running and maintenance of the recording device.

While the invention has been particularly shown and described with reference to a preferred embodiment thereof, it will be understood by those in the art that various changes in form and details may be made therein without departing from the spirit and scope of the invention.

What is claimed is:

1. A transfer type heat sensitive recording device comprising recording means for transferring ink from an ink donor sheet to a recording sheet superimposed thereon by applying thermal pulses, separating means for separating said recording sheet from said ink donor sheet after said thermal transfer recording has been effected, ink donor sheet conveying means for continuously conveying an indeterminate length donor sheet through said recording section and said separating means and for stopping the conveyance of said ink donor sheet when the rear edge of said recording sheet is separated from said ink donor sheet by said separating means, recording sheet supplying means for supplying a recording sheet having a finite length, recording sheet discharge means for discharging said recording sheet after separation by said separating means and a drive force accumulating mechanism for accumulating a portion of the drive force for said ink donor sheet conveying means when said ink donor sheet conveying means is operated and which continues to drive said recording sheet discharge means for a predetermined time subsequent to the stopping of said ink donor sheet conveying means to complete the discharge of said recording sheet.

2. A transfer type heat sensitive recording device as set forth in claim 1, wherein said drive force accumulating means is comprised of a pair of coaxially aligned shafts operatively connected to said ink donor sheet conveying means and said recording sheet discharging means, respectively, spiral spring means located coaxially intermediate said shafts with an outer end of said spiral spring means connected to one of said shafts and the inner end of said spiral spring means connected to the other if said shafts and retarding means for the shaft connected to said recording sheet discharging means which allows the winding up of said spring means during rotation of said recording sheet discharging means and means for releasing said retarding means upon stopping of said ink donor sheet conveying means to allow said spring means to continue to drive said recording sheet discharging means.

3. A transfer type heat sensitive recording device as set forth in claim 2, wherein said ink donor sheet conveying means is operatively connected to one of said shafts by means of a belt and pulley, said pulley being rotatably mounted on said one of said shafts and friction coupling means for coupling said pulley to said one of said shafts.

4. A transfer type heat sensitive recording device as set forth in claim 2, further comprising detector means for detecting the rear edge of said recording sheet as it leaves said separating means, said detecting means being operative to stop said ink donor sheet conveying means and release said retarding means.

* * * * *